United States Patent [19]

Honjo et al.

[11] 4,393,112
[45] Jul. 12, 1983

[54] TRANSFER POWDER MARKING METHOD USING A CORE-SHELL POWDER COMPRISING A PIGMENT, SOLVENT-INSOLUBLE POLYESTER RESIN AND A VOLATILE HALOGENATED HYDROCARBON INSOLUBLE INGREDIENT

[75] Inventors: Satoru Honjo, Asaka; Yasuaki Yuyama; Masakazu Iwasa, both of Odawara; Kazuo Imanishi, Saga, all of Japan

[73] Assignee: Fuji Photo Film Co., Ltd., Kanagawa, Japan

[21] Appl. No.: 265,317

[22] Filed: May 20, 1981

Related U.S. Application Data

[63] Continuation of Ser. No. 46,278, Jun. 7, 1979, abandoned.

[30] Foreign Application Priority Data

Jun. 7, 1978 [JP] Japan ................................. 53-68639

[51] Int. Cl.³ ........................ B32B 5/16; B32B 27/00
[52] U.S. Cl. ..................................... 428/207; 428/407; 430/111; 525/936; 524/500; 524/513; 524/601

[58] Field of Search ................... 101/1, 427, DIG. 13; 430/109, 111; 427/212; 428/207; 260/37 EP, 38 R, 39 P, 40 R, 42.21, 42.24; 524/601, 513, 500

[56] References Cited

U.S. PATENT DOCUMENTS

| 3,910,846 | 10/1975 | Azar | 430/111 |
|---|---|---|---|
| 4,077,324 | 3/1978 | Pacansky | 101/450 |
| 4,105,572 | 8/1978 | Gorondy | 252/62.54 |
| 4,155,883 | 5/1979 | Oguchi | 430/111 |
| 4,187,329 | 2/1980 | Crooks | 430/110 |
| 4,187,774 | 2/1980 | Iwasa | 101/1 |
| 4,192,232 | 3/1980 | Kato | 101/426 |
| 4,242,434 | 12/1980 | Hirakura | 430/122 |
| 4,254,201 | 3/1981 | Sawai | 430/111 |
| 4,262,078 | 4/1981 | Ishida | 430/109 |

Primary Examiner—C. A. Henderson
Attorney, Agent, or Firm—Sughrue, Mion, Zinn, Macpeak and Seas

[57] ABSTRACT

A method for marking employing a novel marking agent is disclosed wherein the marking agent is composed of a fine powder containing about 30 to 75% by volume of an ingredient which is insoluble in a solvent used to fix the marking agent.

22 Claims, 2 Drawing Figures

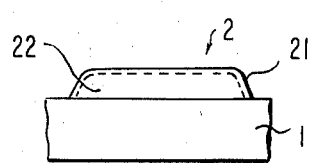
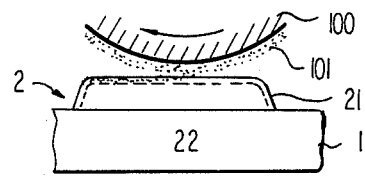
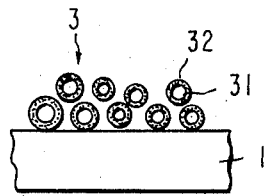
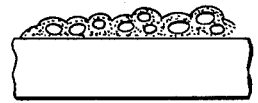

TRANSFER POWDER MARKING METHOD USING A CORE-SHELL POWDER COMPRISING A PIGMENT, SOLVENT-INSOLUBLE POLYESTER RESIN AND A VOLATILE HALOGENATED HYDROCARBON INSOLUBLE INGREDIENT

This is a Continuation, of application Ser. No. 46,278, filed June 7, 1979 now abandoned.

BACKGROUND OF THE INVENTION

1. Field of the Invention

The present invention relates to a powder marking agent and to a method for marking using the marking agent. More particularly, the present invention relates to a novel marking agent containing an insoluble ingredient which reduces the time required to dry a solvent-fixed marking image.

2. Description of the Prior Art

In steel-making plants, etc., it is occasionally necessary to mark production data and shipment destinations on the produced steel sheets, etc. In the past, it has been widely practiced to spray a heat-resistant white paint through a stencil by hand. However, when the products to be marked are at high temperatures, the working environment is uncomfortable to the personnel, and thus it has been desired to improve the marking practice. Moreover, the stencil, usually made from a tin plate, is soiled by the marking paint and must be washed with a washing liquor containing an organic solvent.

Marking methods have been proposed which rely on a disposable paper stencil wherein the stencil is prepared on the basis of information from an electronic computer and automatic spraying is performed through such a stencil. However, the throwaway-type stencil brings about paper waste having the same area as the marking area, and does not fully meet the demand of the users. Another automatic marking method involves spraying a powdery marking agent in a pattern through a plurality of nozzles controlled by an electronic computer, and an electrostatic screen printing process can also be cited. However, all of these methods have many technical disadvantages.

Generally, in a marking method using a powder marking agent, fixing operation is required to permanently fix the marking powder to the marked material. When the temperature of the material to be marked (hereafter "receptor material") is high or when the heat capacity of the material is low, the image can be fixed by heat-softening the thermoplastic resin component of the powder marking agent. However, the receptor material is frequently a material such as a metal plate, tube or slab which has a large heat capacity. When the temperature of the receptor material is lower than the temperature at which the powder is fixed, it is not practical to heat the receptor material to fix the marking powder. Instead, it is desirable to perform "solvent fixation", well known in the fields of electrophotographic or electrostatic recording using a volatile solvent.

Solvent fixation poses several problems in the field of marking. In many cases, the film thickness of the powder image is difficult to accurately control, and accurate control frequently makes the apparatus too expensive for the purpose. As a result, the time required for drying the solvent varies over a wide range as would be theoretically expected from the fact that it is rate-determined by diffusion and is proportional to the square of the film thickness. When there is a sufficiently long period of time from the end of marking to the next manufacturing step this variation can be tolerated. In practice, however, a receptor material such as a steel sheet is frequently subjected to piling with a magnetic chuck, conveying by a magnetic piler in which the marked surface of the receptor sheet contacts a magnetic roller, ultrasonic probing, etc. Thus, the surface of the receptor sheet frequently makes contact with other conveying devices and mechanisms shortly after marking.

When manufacture brings other materials into contact with the surface of the marking pattern and a part of the fixing solvent remains, the image is still mechanically soft and weak and will be damaged and become illegible. When, for example, the fine magnetized iron powder frequently adheres to the surface of a magnetic roller as a result of the adhesion of the iron powder to the image, the image which originally optically contrasts with the background surface of the receptor material will blacken and become illegible.

Since the volatilization of a solvent depends also upon its vapor pressure, the use of solvents having the lowest possible boiling points can lead to shortening of the time required for drying the solvents, and proper heating (by a stream of hot air for example) is also effective. However, for complete fixation, very volatile solvents are difficult to use.

A marking method has been developed which comprises transfer of a pattern of a marking agent across a wide air gap between the member to be marked and an image holding member (see Japanese Patent Application (OPI) No. 74415/77 (DT-OS 2,656,881) (the term "OPI" as used herein refers to a "published unexamined Japanese patent application")) and improvements have been made therein in Japanese Patent Application (OPI) Nos. 126230/77 (DT-OS 2,656,881) and 127454/77 (DT-OS 2,656,881), Japanese Patent Application Nos. 28364/77 (DT-OS 2,811,076; U.S. patent application Ser. No. 886,447, filed Mar. 14, 1978) now U.S. Pat. No. 4,187,774, issued Feb. 12, 1980, 27757/77 (DT-OS 2,811,075; U.S. patent application Ser. No. 886,448, filed Mar. 14, 1978 now U.S. Pat. No. 4,192,232, issued Mar. 11, 1980) and 27756/77 (DT-OS 2,811,075; U.S. patent application Ser. No. 886,448, filed Mar. 14, 1978 now U.S. Pat. No. 4,192,232, issued Mar. 11, 1980).

In Japanese Patent Application No. 37011/77 (Japanese Patent Application (OPI) No. 122431/78), a method of marking is disclosed by the present inventors in which coarse non-softenable particles are used so as to avoid physical adhesion of other materials. It has been found, however, that a magnetic roller frequently holds a large amount of a fine black iron oxide powder, and the fine powder may soil the surface of the marked image due to the shock generated at the time of its contact with the steel material, and therefore this method is not completely effective.

SUMMARY OF THE INVENTION

It is an object of this invention to provide an improved marking method in which a novel powder marking agent is used.

Another object of this invention is to provide an improved marking method which utilizes solvent fixation.

Still another object of this invention is to provide a marking method in which the time required for drying the solvent-fixed marking image is shortened.

A further object of this invention is to provide a marking powder having a novel composition.

It has now been found that the above objects can be achieved by including 15 to 70% by volume of an ingredient which is insoluble in a fixing solvent in the marking powder.

BRIEF DESCRIPTION OF THE DRAWINGS

FIG. 1 illustrates a conventional marking method using a powder marking agent, wherein (a) is a schematic sectional view showing a marking image in which a conventional marking powder is solvent-fixed, and (b) is a schematic sectional view showing a magnetic roller holding fine powders rotating and making contact with the marking image shown in (a); and FIG. 2 illustrates a marking method using a powder of this invention wherein (a) is a schematic sectional view showing a marking image composed of the marking powder of this invention provided on a substrate and (b) is a schematic sectional view showing the solvent-fixed marking image (a).

DETAILED DESCRIPTION OF THE INVENTION

The present invention can be applied to all marking methods which rely upon a powder marking agent, and the principle or method of image formation is not limited. The present invention is preferably applied to the method disclosed in Japanese Patent Application (OPI) No. 74415/77 wherein a pattern of the marking material is electrostatically recorded and transferred to a receptor sheet, or to electrostatic or electrophotographic recording methods. However, it will be readily apparent that the teachings of this invention can also be used in conjunction with many other recording methods cited hereinabove.

The marking powder should optically contrast with the substrate to be marked. Since metallic materials are generally dark in appearance, the marking powders are usually a high refractive index white pigment and a solvent-soluble resin. Furthermore, the pigment should not undergo a marked color change or decompose at temperatures up to about 400° C. Typical examples of the white pigment are titanium oxide, zinc oxide, zirconium oxide, antimony oxide, zinc sulfide, etc. When the receptor material has a bright appearance, the marking powder can be prepared from many inorganic pigments (e.g., carbon black, $Fe_3O_4$, $Fe_2O_3$ (red iron oxide), chromium oxide, Prussian Blue, cobalt blue, etc.), organic pigments (e.g., quinacrydone, Benzidine Yellow, Phthalocyanine BLue, Phthalocyanine Green, etc.), and dyes having a dark color or a brilliant color. Thus, the optical characteristics of the marking powder can be selected depending upon the use of the powder, etc.

A variety of solvent-soluble resins can be used. The most important considerations in selecting the solvent-soluble resin are the ease with which it can be dissolved in the fixing solvents, the temperature of the receptor material, the durability of the marking image, and the adhesion of the resin to the receptor material. That the marking powder be able to withstand the high temperatures of the receptor material is especially important. A variety of common organic solvents can be used as a fixing solvent in the present invention such as low boiling ketones such as methyl ethyl ketone, acetone, methyl isobutyl ketone, etc., and aromatic hydrocarbons such as toluene, xylene, etc. However, resins or polymers which are soluble in either low-toxic volatile halogenated hydrocarbons, e.g., methylene chloride, trichloroethylene, etc., or acetic acid esters of alcohols having up to 4 carbon atoms are especially preferred from the standpoint of their industrial safety.

Linear polyesters can be singled out as resins having particularly good heat resistance. Preferred examples include those linear polyesters derived from an acid component composed mainly (30 to 100 mol%) of an aromatic dicarboxylic acid and a diol component composed mainly (20 to 90 mol%) of a linear diol in which the hydrogens on the β-carbon atoms are all replaced by lower alkyl groups (e.g., methyl or ethyl) such as neopentyl glycol. Such polyesters are disclosed in U.S. patent application Ser. No. 852,263, filed Nov. 17, 1977, now U.S. Pat. No. 4,218,362, and are designed so as to give an amorphous structure and thus to render them rapidly soluble in solvents such as aromatic hydrocarbons or ketones, e.g., toluene or methyl ethyl ketone. These polymers are preferred because they withstand high temperatures of up to about 350° C. and particularly up to 375° C. A suitable molecular weight for these polyesters ranges from about 12,000 to 25,000, preferably from about 14,000 to 22,000. The linear polyesters of the present invention suitably have an intrinsic viscosity of about 0.4 to 1.2.

Suitable examples of aromatic dicarboxylic acids which can be used in the linear polyesters include terephthalic acid, isophthalic acid, etc. Up to 20% by weight of an aliphatic dicarboxylic acid such as adipic acid, sebacic acid, etc., may be substituted for the aromatic dicarboxylic acid.

Suitable examples of diol components which can be used in the present invention include those described in British Pat. No. 1,118,538, i.e., diols having the formula:

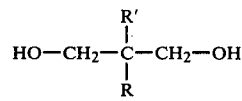

wherein R and R' are alkyl radicals each containing 1 to 5 carbon atoms, with compounds in which both R and R' are a methyl group; R is a methyl group and R' is an ethyl group; or both R and R' are an ethyl group being preferred. Further, mixtures of such diols may also be used.

When conditions for heat resistance are less severe, many other thermoplastic resins and uncured thermosetting resins can be used. For example, polyesters derived from aliphatic dicarboxylic acids such as adipic acid, sebacic acid, etc., and from a diol component containing ethylene glycol, propylene glycol, diethylene glycol, triethylene glycol, etc., as a main ingredient can be used. Suitable polyesters have a moderately high softening point and those having a softening point as determined by the ring-and-ball method of 140° C. to 170° C. are especially desirable in view of the blocking tendency of the marking powder finally obtained. A suitable molecular weight for the polyesters ranges from about 12,000 to 40,000 are preferably from about 15,000 to 30,000. Other properties of the polyesters which are particularly important conditions when selecting suitable polyesters for use in the present invention are: (1) they can be brought into intimate contact with metals without undercoating; (2) the second order transition temperature thereof is not less than about 30°

C.; (3) they are soluble in common organic solvents; and (4) they have a good compatibility with the linear polyesters.

Polyesters are especially preferred as the solvent-soluble ingredients in this invention because they have superior adhesion to metals. It is possible to blend the polyesters with relatively low molecular weight (e.g., on the order of several hundreds to at most about 1,000) epoxy resins, phenolic tesins (e.g., phenol-formaldehyde resin), xylene resins (e.g., xylene-formaldehyde resin), petroleum hydrocarbon resins, etc., in an amount up to about 20% by weight. Naturally these resins should be compatible with the polyester. Suitable examples of epoxy resins which can be used in the invention are those having an epoxy equivalent of about 350 to 4,000 and a softening temperature of about 60° to 160° C., e.g., Epikotes 1001, 1004 and 1007 (products of Shell International Chemicals Corp.), Araldites 6071, 6084, 6097 and 6099 (products of Ciba-Geigy AG), etc. Suitable examples of phenol-formaldehyde resins are Hitanol 1501 and Vitanol 2180, both of which are products of Hitachi Chemical Co., Ltd.; suitable examples of xylene-formaldehyde resins are Nikanol L (a product of Mitsubishi Gas Chemical Co., Ltd.); and suitable examples of petroleum hydrocarbon resins are Petrodine #80 (a product of Mitsui Petrochemical Industries, Ltd.). Of these resins, the epoxy resins are most preferred.

Thermosetting polyesters cross-linkable with isocyanates can also be used in the present invention. Other solvent-soluble resins that can be utilized in this invention include polycarbonate resins, epoxy resins, phenoxy resins, polyacrylates, polymethacrylates, copolymers composed mainly of acrylates or methacrylates, polyvinyl chloride, styrene copolymers, and ethylene/vinyl acetate copolymer, and cellulose acetate butyrate. Especially preferred are thermosetting acrylic resins cross-linkable with polyisocyanate, etc., polycarbonate resins, epoxy resins, or ethylene/vinyl acetate copolymer.

The composition of the marking agent of this invention is characterized by the fact that it contains an ingredient insoluble in the fixing solvent in concentrations higher than generally encountered in marking powders. If the solvent-insoluble ingredient consists solely of the aforesaid inorganic or organic pigments many problems are encountered involving the flow characteristics of the powder and economy. As far as the coloring function is concerned, a sufficient amount of the pigments is at most about 20% by volume, preferably about 7 to 15% by volume. In particular, two embodiments of the present invention are contemplated: one, in which a solvent-insoluble resin is mixed together with the soluble resin and the pigment uniformly; and another in which the solvent-insoluble resin forms a core around which a composition of soluble resin, pigment and/or some solvent-insoluble ingredient is formed.

In a preferred embodiment of this invention, 15 to 70% by volume (inclusive of any pigment) of the powder marking agent is composed of an organic resin which is insoluble in the fixing solvents. Most desirably this resin is cross-linked and is insoluble in most solvents. If the content of the insoluble ingredient is less than 15% by volume, the drying time tends to depend upon the film thickness, and also becomes too long. On the other hand, when it exceeds 70%, the physical strength of the resulting image is insufficient. The suitable upper limit to the amount of the insoluble ingredient is about 65% when conditions relating to the durability of the image are severe, or when the surface of a substrate (a material to be marked) has a high degree of smoothness.

Typical examples include cross-linked phenolic resins (e.g., cross-linked phenol-formaldehyde resin), cross-linked melamine resins (e.g., cross-linked melamine-formaldehyde resin), cross-linked urea resins (e.g., cross-linked urea-formaldehyde resin), cross-linked epoxy resins (e.g., condensation products of bisphenol A and epichlorohydrin cross-linked with diamines, polyamines, acid anhydrides, or the like), cross-linked thermosetting linear polyester resins (e.g., condensation products of dicarboxylic acids and diols containing terminal hydroxy groups, which are cross-linked with polyisocyanate compounds), cross-linked unsaturated polyester resins (e.g., condensation products of aliphatic diols and dicarboxylic acids cross-linked through the unsaturated groups), and cross-linked xylene resins (e.g., cross-linked xylene-formaldehyde resin), with the cross-linked melamine-formaldehyde resin, cross-linked thermosetting linear polyester resins and cross-linked epoxy resins being preferred. These resins are generally cross-linked by heat, catalyst, light, etc. Desirably, the insoluble resin is cross-linked before mixing with the soluble resin so as not to disturb the conventional powder manufacturing processes.

Although thermosetting resins are most preferred, they must be cross-linked. Thus, in view of economy, the use of thermoplastic resins, if possible, would be suitable. The thermoplastic resins are desirably incompatible with the solvent-soluble resins, and must not be soluble in the fixing solvents. In principle, the insoluble resin is selected depending upon the combination of the soluble resins and fixing solvents, and it is difficult to describe the host of resins which would be suitable for the purpose. The insoluble resins should not decompose at temperatures up to about 350° C.; and when decomposition takes place, they should not give toxic decomposition products, or if a toner having a faint color is used, it is not deeply colored by the decomposition. Furthermore, the insoluble resins should hardly swell in the fixing solvent. However, such insoluble resins can be basically divided into two groups.

A first group includes insoluble resins which have high softening temperatures (e.g., greater than about 150° C. and preferably above 200° C.), high molecular weights and high melt viscosities and behave like a pigment. Such resins do not appreciably disturb a conventional dry-method powder manufacturing step. Examples of the first group include poly(methyl methacrylate), an acrylonitrile/styrene copolymer, polyacrylonitrile, highly crystalline linear polyesters, highly crystalline polyamides, cellulose, polycarbonate, polytetrafluoroethylene, and polyvinylidene fluoride. It has been ascertained that unless the temperature is raised excessively, these resins do not agglomerate and undergo phase separation when they are charged into a kneader or the like together with the solvent-soluble resins or pigments. Furthermore, when they are used as marking agents they do not agglomerate on a high temperature material. Hence, no particular restriction is imposed on these resins in actual practice.

A second group includes resins which are difficult to dissolve in solvents, have relatively lower melting temperatures (e.g., about 90° C. to 150° C.) and low viscosities, and which when melted, agglomerate and undergo phase separation. Specific examples of the second group are polyethylene, polypropylene and polyvinyl chloride. Marking powders can only be formed from these resins by spray drying, and in actual practice they are difficult to use in conjunction with receptor materials at high temperatures.

Resins having relatively high hydrophilicity can also be used as the ingredient insoluble in fixing solvents. However, since they tend to degrade the electrical insulating property of the resulting marking powder, special considerations such as the maintenance of the entire system at low humidities are required when the image is formed by electrostatic or electrophotographic recording. Examples of such hydrophilic resins are starch, modified starch, polyvinyl alcohol, carboxymethyl cellulose, hydroxyethyl cellulose, and methyl cellulose. A styrene/maleic anhydride copolymer and half alkyl esters thereof can also be used.

The aforesaid ingredients are formed into a fine powder having a particle diameter of about 20 to 200 $\mu$m, preferably about 40 to 150 $\mu$m, by a suitable method such as spray drying or kneading-pulverization. A so-called flow controlling agent (specifically, oligomers of acrylic esters, etc., as described in, for example, U.S. patent application Ser. No. 255,878, filed May 10, 1972 (Japanese Patent Application (OPI) No. 55736/74)) is added as a minor component in an amount up to about 2% by weight of the total weight of the marking agent.

In an especially preferred embodiment of this invention the marking powder is composed of a core of the solvent-insoluble ingredient (e.g., corn starch, glass beads, resin, etc.) and a thin coating composed of a thermoplastic resin and a pigment having a high covering power formed on its surface. Mixing conditions are selected such that the insoluble core is sufficiently coated with the shell, and that the core per se is not pulverized. The best method for mixing is to use a solvent capable of dissolving the shell components after kneading the pigment with the other ingredients in the shell.

The content of the solvent-insoluble ingredient of such a powder is determined by the size of the core material and the content of the other ingredients in the surface coating which are insoluble in the solvent such as the pigment. First, assuming that both the marking agent and the core material are spherical and the radius of the marking agent is $r_m$ and the radius of the core material is $r_c$, since the radius of the core $r_c$ must be less than the radius of the marking agent $r_m$, $r_c = kr_m$ where $k < 1$. Further, assuming the volumetric content of the solvent-insoluble component in the surface coating is C, the volumetric content of the solvent-insoluble ingredients in the entire marking agent $\alpha$ is expressed as follows:

$$\alpha = \frac{4/3\pi r_c^3}{4/3\pi r_m^3} + \frac{4/3\pi(r_m^3 - r_c^3)}{4/3\pi r_m^3} C$$

$$\alpha = k^3 + (1 - k^3)C$$

In other words, $\alpha$ equals the sum of the core volume which is by definition insoluble ($4/3\pi r_c^3$) plus the volume of the shell occupied by insolubles such as pigments $[4/3\pi(r_m^3 - r_c^3)]C$ divided by the total volume of the powder ($4/3\pi r_m^3$).

In accordance with the present invention, C is generally about 0 to 3 (0 to 30 vol%). When the solvent-insoluble content $\alpha$ is less than 30% by volume, the drying characteristics are not improved and the drying time tends to highly depend on the thickness of the marking image. If $\alpha$ exceeds 75% by volume, the durability of the marking image tends to be low. Specific combinations of k (where k is the ratio of the core radius $r_c$ to the marking powder radius $r_m$) and C for $\alpha = 0.30$ to 0.75 (about 30 to 75 vol%) are shown in Table 1.

TABLE 1

| C | k |
|---|---|
| 0 | 0.67–0.91 |
| .1 | 0.60–0.90 |
| .2 | 0.50–0.88 |
| .25 | 0.40–0.87 |

When C equals 0 and the core material does not contain pigment, the optical contrast of the final image tends to be undesirably low. As another practical restriction, when C is much higher than 0.20 and the marking agent is used as a toner, the charge holding capacity is reduced, or the flowability of the powder under heat is low. Thus, heat fixation is effected only at high temperatures (in the absence of the action of solvent). Hence, C may be taken as about 0.25 at the highest.

When C is 0, the surface layer consists of a solvent-soluble resin ingredient. In this case, it is necessary to include a white pigment or the like in the core material. Experiments have shown that even in the absence of pigment from the surface layer, some degree of light scattering is observed due to the difference in refractive index between the core material and the surface layer, and because of this effect, the amount of the white pigment can frequently be reduced.

The preferred average particle diameter (weight average) of the marking agent is about 60 to 90 $\mu$m. Since the k value is from about 0.40 to 0.91 as is seen from Table 1, it is appreciated that materials having a particle diameter of about 24 to 80 $\mu$m can be used as the core material if they have an ideal construction.

When the powder in accordance with the present invention is used electrostatically or electrophotographically as a toner, it is preferred that the toner has a volume resistivity of above about $10^{10}\Omega$.cm, preferably above about $10^{12}\Omega$.cm, most preferably above about $10^{13}\Omega$.cm. Further, it is preferred that the toner does not have an extremely high dielectric constant but has a dielectric constant of not higher than about 10, preferably 2 to 8.

The method of this invention and a conventional method will be further illustrated by reference to FIGS. 1 and 2. FIG. 1 (a) and (b) show the conventional method. A marking image 2 formed as a continuous film after being dissolved in a solvent is provided on a substrate 1. Since the pigment content is at most about 10 to 15% by volume the film surface 21 dries relatively rapidly, but its inside 22 is slow in drying partly because it is difficult for the solvent to pass through the surface layer. Experiments show that when the film thickness is at least 60 $\mu$m and trichloroethylene is used a period of several hours or more is required for the film to solidify completely in an atmosphere kept at 25° C.

FIG. 1 (b) shows a magnetic roller 100 holding a fine powder 101 such as a magnetized iron or iron oxide powder rotating and making contact with the undried marking image. Naturally, a part of the fine powder 101 becomes embedded in the surface of the film and cannot be removed. Generally, the subsequent step is performed after a lapse of several tens of seconds to several minutes, and heat drying may be done during this time interval. But in many cases, investment in such facilities is impracticable.

According to the method of this invention, the pigment or the solvent-insoluble ingredients occupy a large volume of the film. Hence, even after the film has been partially dried, a firm layer does not easily form on its surface and the interior of the film is also uniformly dried. It has been found that in a particularly preferred embodiment of the present invention in which a relatively large core material is present, the fixed image assumes the cross-sectional configuration shown in FIG. 2 (b), becoming substantially free of tendency to attract fine powder such as dust or iron particles floting in the steel works atmosphere. Thus the marking powder of the present invention is particularly suitable as a non-magnetic powder, i.e., a powder which is particularly well suited for use in combination with a magnetic toner or magnetic brush.

FIG. 2 (a) shows a preferred embodiment of the present invention in which an image formed of a marking powder 3 consisting of an insoluble core material 31 and a surface layer 32 of pigment is formed on a substrate 1. When a solvent is sprayed onto the image, the state shown in FIG. 2 (b) is attained. The film thickness around the core decreases from the original value, and a great portion thereof flows onto the surface of the substrate.

In other words, even when an image with an average film thickness of more than about 60 $\mu$m is produced by exercising relatively rough control, the film thickness which requires substantial drying decreases from two-thirds to one-third, and in addition, hard particles form already on its surface in a raised fashion. It will be understood therefore that even when such an image makes contact with a magnetic roller, the degree of soiling is much lower than in the case of FIG. 1. This will be explained in more detail by Examples given hereinbelow.

A solvent is applied by air spray or airless spray after image formation, or by coating it on the surface of the substrate through roller coating, airless spray coating, etc., before image formation. In the present invention, airless spray is especially preferred. To coat a fixing agent beforehand, transfer of the image should be performed through a relatively large space, and can be best performed in combination with the methods which we previously developed.

Among the advantages of the method of this invention there are:

(1) The time required for drying can be drastically reduced.

(2) When an organic resin is used as a solvent-insoluble ingredient, the specific gravity of the marking agent does not so much increase and is at most about 2.0. Thus, the marking agent does not become appreciably heavy, and has good flow characteristics when used in developing a latent electrostatic image. The preferred density range is from 1.3 to 1.8.

(3) When an organic resin is used, the electrical insulation of the marking agent is good. Thus, when it is used in the development of a latent electrostatic image as stated in (2) above, its flowability characteristics are stable, and do not substantially show humidity dependence.

The following Examples illustrate the present invention in greater detail.

EXAMPLE 1

Corn starch was screened, and particles having a particle diameter of 25 to 50 $\mu$m were collected. These particles were used as a core material, and mixed with 5 kg, per kg of the core, of a coating solution for forming a surface layer. The mixture was sufficiently stirred.

|  | Parts by Weight |
| --- | --- |
| Vylon 200 (a polyester resin made by Toyo Boseki Co., Ltd.) | 150 |
| Titanium Oxide (Tipaque R-830, a product of Ishihara Sangyo Kaisha, Ltd.) | 50 |
| Methylene Dichloride | 800 |

The mixture was granulated by spray drying. Microscopic examination showed that almost all of the particles contained 1 to 2 core particles, and their surfaces were coated with a white layer having a thickness of about 5 $\mu$m (corresponding to C=0.1, k=0.75). The particles had a specific gravity of 1.3.

A latent electrostatic image was developed on an insulating layer with this mixture and the image was transferred to a steel sheet. The image consisted of a regular arrangement of small dots having a size of 2 mm $\times$ 2 mm. Trichloroethylene was sprayed onto the image and dried. The thickness of the dot portion was about 80 $\mu$m at the most. After spraying of trichloroethylene, air at room temperature was blown against the fixed image. When the image was then urged against a magnetic roller holding a magnetized iron powder, the contrast of the image scarcely decreased.

For comparison, a powder composed of 150 parts by weight of Vylon 200 and 50 parts of titanium oxide was prepared by kneading in a kneader and refrigerating and pulverizing the mixture (average particle diameter 70 $\mu$m). An image was formed in a similar manner, and the film thickness at the dot portion was adjusted to about 50 $\mu$m. Under the same drying conditions, a magnetic roll was urged against the image. The image was scarcely legible.

EXAMPLE 2

4.2 kg of a coating composition prepared by dissolving or dispersing 5 parts by weight of an epoxy resin, 70 parts by weight of a linear polyester resin and 25 parts by weight of titanium oxide in 900 parts by weight of methylene chloride was mixed with 1.7 kg of glass spheres having a particle size of 50 $\mu$m and a specific gravity of 2.4, and spray dried. This powder composition corresponded to k=0.9 and C=0.10, and the amount of the insoluble ingredient was 70% based on the entire powder.

Using this powder and the powder prepared without the glass spheres, a layer having a weight of 80 g per unit area was formed. Dichloroethane was blown against it to dissolve the resin and air at 40° C. was applied. The coating containing the glass spheres dried to a state perceptible to the touch, whereas the coating not containing the glass spheres was soft even after 1 hour.

EXAMPLE 3

1 kg of polyethylene (specific gravity 0.92) pulverized to an average particle diameter of 15 $\mu$m by a Jet-O-mizer (a product of Fluid Energy Processing and Equipment Co.) was mixed with 5.0 kg of a uniform mixture of 75 parts by weight of Vylon 200 (a linear polyester resin made by Toyo Boseki Co., Ltd.), 25 parts by weight of titanium oxide and 900 parts by weight trichloroethylene. The mixture was spray dried. This composition corresponded to k=0.9 and C=0.10, and the volume of the insoluble ingredient occupied 75% of the entire powder. Each of the particles contained 2 to 3 polyethylene particles and had a particle diameter of 50 to 90 μm.

Drying after dissolving with trichloroethylene as in Example 1 was about 10 times as fast as a film of the same thickness not containing the polyethylene.

EXAMPLE 4

0.165 kg of polyethylene (specific gravity 0.93) having a particle diameter of 20 to 30 μm was collected and mixed with 5 kg of a uniform mixture prepared by dissolving or dispersing 60 parts by weight of a thermosetting acrylic resin obtained by reacting a terpolymer composed of 45 parts by weight of methyl methacrylate, 49 parts by weight of ethyl acrylate and 6 parts by weight of methacrylic acid with 28 parts by weight of Epikote 1001 (a product of Shell International Chemicals Corp.) and 40 parts by weight of titanium oxide in 400 parts by weight of ethyl acetate. The mixture was spray dried. Particles having a particle diameter of 40 to 90 μm were collected. The composition of these particles corresponded to k=0.6 and C=0.15, and the volumetric content of the insoluble ingredient was about 35%. The marking agent had a specific gravity of 1.5. The time required for drying this powder was markedly shortened.

EXAMPLE 5

A commercially available white low temperature-curable epoxy resin powder paint (Evaron 2000 QD Type, a product of Chugoku Marine Paints, Ltd.) was blown into an atmosphere held at 150° C. and cured in powder form. The cured particles were used as a core material. This core contained about 10% by weight of a white inorganic pigment, and had a particle diameter of about 65 μm (specific gravity about 1.5).

0.49 kg of a linear polyester resin (specific gravity 1.26) was added per 1.5 kg of the white core material and they were mixed in a kneader. The mixture was then refrigerated at −10° to −20° C. and pulverized to form particles having a particle diameter of about 80 μm. The product showed the same fast drying property as in Example 4 when used as a marking agent (k=0.9, C=0, content of the insoluble ingredient=0.72). The particles had a specific gravity of 1.45.

EXAMPLE 6

1 kg of a fine powder (8 to 10 μm) of polytetrafluoroethylene ("TLP-10", a product of Mitsui Fluorochemical Co., Ltd.; specific gravity 2.20) was mixed in a kneader with 210 g of titanium oxide, 420 g of a linear polyester resin (Vylon 200) and 70 g of an epoxy resin. The kneaded mixture was refrigerated at −10° to −20° C. and pulverized to obtain a powder having a particle diameter of 50 to 100 μm (corresponding to C=0.1, k=0.8 and the water-soluble ingredient content of 0.60; specific gravity 1.85). This powder was highly electrically insulating and showed almost ideal characteristics in the development of a latent electrostatic image.

A dot pattern having a dot size of 1 mm × 1 mm with a space of 1 mm was formed using this powder and transferred to the surface of a steel sheet at room temperature. The transferred pattern was fixed by spraying methylene chloride. The completely dried film had a thickness of about 40 μm. A fine powder of iron oxide was rubbed against the fixed image at different times after fixing. In 3 minutes after the fixing, the powder was no longer tacky.

EXAMPLE 7

In this Example, a molding powder of melamine-formaldehyde resin was used as a core material. 3 mols of formaldehyde and 1 mol of melamine were charged into a reactor equipped with a reflux condenser and a stirrer, and the malemine was dissolved at 55° C. Sodium carbonate was added to adjust the pH of the mixture to 8. The temperature was raised to 85° C. to perform condensation, and the entire reaction mass was dried in a stream of air at 70° to 80° C. The resulting product was coarsely pulverized and heated at 150° C. for 10 minutes to cross-link it. The pulverized product was further pulverized by an adiabatic-type pulverizer and particles having a particle diameter of 25 to 45 μm were collected.

1.3 kg of the cross-linked melamine resin was mixed in a kneader with 1.1 kg of an ethylene/vinyl acetate copolymer and 0.2 kg of titanium dioxide. The kneaded mixture was refrigerated at −10° to −20° C. and pulverized to form a powder having a particle diameter of 50 to 150 μm. The composition of the powder corresponded to C=0.04, k=0.794, α=0.51. When this powder was fixed by trichloroethylene, it showed especially fast drying properties.

EXAMPLE 8

Melamine-formaldehyde resin obtained by the same method as in Example 7 was used as a core material, except that titanium dioxide was added to this core material. Specifically, after continuing the condensation reaction at 85° C., 0.4 kg, per kg of the melamine resin, of titanium dioxide was added. The core material was thereafter prepared in the same way as in Example 7. The surface layer consisted of a linear polyester resin. Specifically, 0.8 kg of a linear polyester resin (Vylon 200, a product of Toyo Boseki Co., Ltd.) was added per 1.4 kg of the core material. In the same way as in Example 7, a powder having a particle diameter of 50 to 150 μm was obtained.

EXAMPLE 9

Example 6 was repeated except that 0.5 kg of poly(methyl methacrylate) having a molecular weight of 150,000 to 200,000 was used instead of 1 kg of polytetrachloroethylene. Similarly, good results were obtained.

While the invention has been described in detail and with reference to specific embodiments thereof, it will be apparent to one skilled in the art that various changes and modifications can be made therein without departing from the spirit and scope thereof.

What is claimed is:

1. In a marking process which comprises transfer of a pattern of a powder of a marking agent across a wide air gap between a metal member to be marked in a marking pattern and an image-holding member and solvent-fixing said powder, the improvement wherein said powder has a particle diameter of about 20 to 200 μm and comprises a pigment, a fixing solvent-soluble polyester resin, and from 15 to 70% by volume of the marking agent of a volatile halogenated hydrocarbon-insoluble ingredient, wherein said powder comprises a core and a shell portion wherein said core consists of said volatile halogenated hydrocarbon-insoluble ingredient.

2. The process of claim 1, wherein said solvent-insoluble ingredient is a cross-linked resin.

3. The process of claim 1, wherein said pigment is present in said powder in an amount of about 7 to 15% by volume.

4. The process of claim 2, wherein said cross-linked resin is selected from the group consisting of cross-linked phenolic resins, cross-linked melamine resins, cross-linked urea resins, cross-linked epoxy resins, cross-linked thermosetting linear polyester resins, cross-linked unsaturated polyester resins and cross-linked xylene resins.

5. The process of claim 1, wherein the ratio of the radius of said core to the radius of said marking powder is about 0.4 to 0.91.

6. The process of claim 4, wherein said marking powder has a diameter of about 60 to 90 μm and said core has a diameter of about 24 to 80 μm.

7. The process of claim 1, wherein said pigment is titanium oxide, zinc oxide, zirconium oxide, antimony oxide, or zinc sulfide.

8. The process of claim 1, wherein said polyester is a linear polyester of an aromatic dicarboxylic acid and a β-alkyl substituted diol.

9. The process of claim 1, wherein said polyester is blended with an epoxy resin, a phenolic resin, a xylene resin or a petroleum hydrocarbon resin.

10. The process of claim 1, wherein said polyester is a linear polyester.

11. The process of claim 10, wherein said linear polyester is derived from an acid component comprising 30 to 100 mol percent of an aromatic dicarboxylic acid and a diol component comprising 20 to 90 mol percent of a linear diol in which the hydrogens on the β-carbon atoms are all replaced by methyl or ethyl groups.

12. The process of claim 11, wherein said linear polyester has a molecular weight of about 12,000 to about 20,000.

13. The process of claim 12, wherein said linear polyester has an intrinsic viscosity of about 0.4 to 1.2.

14. The process of claim 12, wherein said linear dicarboxylic acid is terephthalic or isophthalic acid.

15. The process of claim 1, wherein said linear polyester is derived from an acid component comprising 30 to 100 mol percent of an aromatic dicarboxylic acid and 20 to 90 mol percent of a diol having the formula:

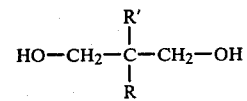

wherein R and R' are alkyl radicals each containing 1 to 5 carbon atoms.

16. The process of claim 1, wherein said marking powder has an average particle diameter of 60 to 90 μm.

17. The process of claim 1, wherein said volatile halogenated hydrocarbon-insoluble ingredient is a hydrophilic resin.

18. The process of claim 17, wherein said hydrophilic resin is selected from the group consisting of starch, modified starch, polyvinyl alcohol, carboxymethyl cellulose hydroxyethyl cellulose, methyl cellulose, a styrene/maleic anhydride copolymer or a half alkyl ester thereof.

19. The process of claim 1, wherein said volatile halogenated hydrocarbon-insoluble ingredient is a glass bead.

20. The process of claim 1, wherein said volatile halogenated hydrocarbon-insoluble ingredient is selected from the group consisting of poly(methyl methacrylate), an acrylonitrile/styrene copolymer, polyacrylonitrile, a highly crystalline linear polyester, a highly crystalline polyamide, cellulose, polycarbonate, polytetrafluoroethylene, polyvinylidene fluoride, polyethylene, polypropylene or polyvinyl chloride.

21. The process of claim 1, wherein said shell portion comprises said pigment and said fixing solvent-soluble polyester resin.

22. The process of claim 1, wherein said volatile halogenated hydrocarbon-insoluble ingredient is selected from the group consisting of methylene chloride or trichloroethylene.

* * * * *

UNITED STATES PATENT AND TRADEMARK OFFICE
CERTIFICATE OF CORRECTION

PATENT NO. : 4,393,112

DATED : July 12, 1983

INVENTOR(S) : SATORU HONJO ET AL

It is certified that error appears in the above—identified patent and that said Letters Patent is hereby corrected as shown below:

On the title page assignees should read

-- Assignees: Fuji Photo Film Co., Ltd., Kanagawa; Chugoku Marine Paints, Ltd., Hiroshima, both of Japan --.

Signed and Sealed this

Sixth Day of December 1983

[SEAL]

Attest:

GERALD J. MOSSINGHOFF

Attesting Officer

Commissioner of Patents and Trademarks